United States Patent

Sears

[11] Patent Number: 5,116,698
[45] Date of Patent: May 26, 1992

[54] BIFOLD SEPARATOR

[75] Inventor: Stanley L. Sears, Bristol, Tenn.

[73] Assignee: Eveready Battery Company, Inc., St. Louis, Mo.

[21] Appl. No.: 551,185

[22] Filed: Jul. 11, 1990

[51] Int. Cl.$^5$ .............................................. H01M 2/18
[52] U.S. Cl. ...................................... 429/94; 429/131; 429/144
[58] Field of Search ................. 429/94, 136, 138, 131, 429/211, 142

[56] References Cited

U.S. PATENT DOCUMENTS

| | | | |
|---|---|---|---|
| 1,087,612 | 2/1914 | Simmons | 429/136 |
| 2,010,498 | 8/1935 | Smith | 136/147 |
| 2,851,509 | 9/1958 | Pasquale et al. | 429/131 |
| 3,350,239 | 10/1967 | Stanimirovitch | 136/176 |
| 3,514,331 | 5/1970 | Cupp et al. | 429/136 |
| 3,900,340 | 8/1975 | Greaser et al. | 136/13 |
| 4,215,186 | 7/1980 | Jaeger | 429/131 |
| 4,539,271 | 9/1985 | Crabtree | 429/94 |
| 4,663,253 | 5/1987 | Simonton et al. | 429/139 |
| 4,668,320 | 5/1987 | Crabtree | 429/94 |
| 4,709,472 | 12/1987 | Machida et al. | 242/56.1 |
| 4,802,275 | 2/1989 | Freluche | 429/94 |

Primary Examiner—Anthony Skapars
Attorney, Agent, or Firm—Robert W. Welsh

[57] ABSTRACT

A bifold electrode and separator assembly is disclosed for winding into a jelly roll galvanic cell, the first generally rectangular electrode being enveloped by first and second separator sheets having a width twice that of the electrode and a length substantially that of and slightly greater than the electrode, the first sheet being folded along one elongated edge of the electrode and adhered to the two side faces thereof, and the second sheet folded along the second elongated edge of the electrode and adhered to the first sheet over the two side faces of the electrode. A terminal tab extends from the electrode through the fold of one of the sheets. A second electrode is placed on the outside, and the assembly wound into a jelly roll for placement in a cell container.

8 Claims, 1 Drawing Sheet

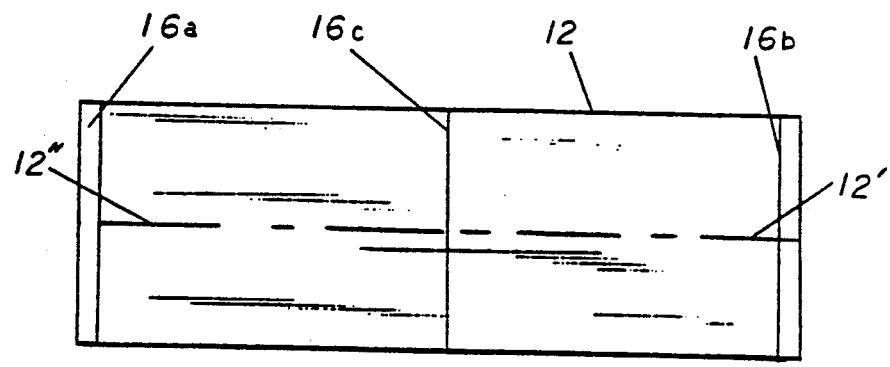
FIG 1
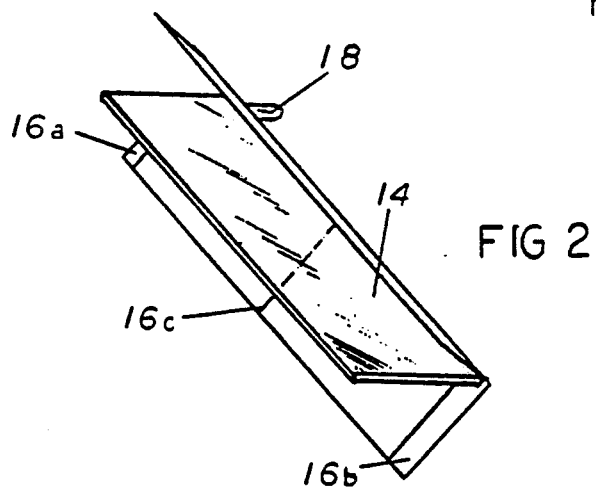
FIG 2
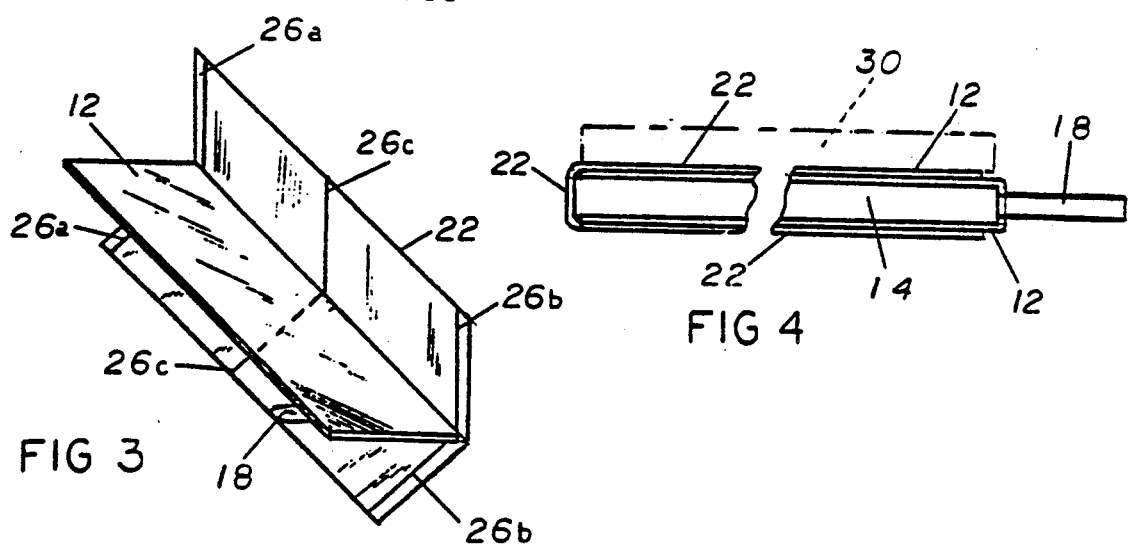
FIG 3
FIG 4

BIFOLD SEPARATOR

RELATED APPLICATION

This is a continuation-in-part application of copending application Ser. No. 07/351,775 entitled BIFOLD SEPARATOR filed May 15, 1989, now abandoned.

BACKGROUND OF THE INVENTION

This invention relates to an electrode and separator assembly for galvanic cells. This invention particularly relates to coiled, i.e., so-called jelly roll type, galvanic cells and particularly to the electrode and separator assembly therefor.

Jelly roll type galvanic or electrochemical cells, e.g. nickel cadmium cells, have the electrodes electrically separated by an insulative sheet separator, the two electrodes and the separator being rolled up to fit into a cylindrical container An electrical lead extends from one of the electrodes to serve as a terminal, to connect to an exterior load. The container engages the other electrode directly or through another lead to serve as the other terminal. Such a cell is shown, for example in U.S. Pat. No. 3,900,340.

A significant advantage of using the jelly roll construction is that the interfacial surface area between the two electrodes is greatly increased relative to the interfacial surface area obtainable, for example, when using a bobbin construction. However, as the surface areas of the electrodes increase, the amount of separator required increases proportionately. The net result is that a significant percentage of the internal volume of the cell is occupied by the separator. The more space that is required for the separator, the less that is available for active electrode material.

Cell constructions used in commercially available batteries and/or disclosed in literature exemplify numerous methods of using separators to physically isolate one electrode from the other electrode. Most of these use separator material that is longer and wider than one of the electrodes. In many cases, the amount of excess separator exceeds the minimum amount of required separator by at least 15 percent, based on the surface area of the electrode, and often up to or greater than 30 percent. Even with this excessive amount of separator, many cell constructions have internal electrical shorting caused by loose mix particles.

SUMMARY THE INVENTION

The proposed invention comprises unique encasing of an electrode and separator, resulting in simultaneously reducing the amount of excess separator and largely sealing the electrode against internal shorting caused by loose mix particles. Thin lines of adhesive are applied to the inside surface of each of two separators. One strip of adhesive is preferably near the center of each separator while the other strips are near the outer edges. All lines of adhesive are perpendicular to the central longitudinal line about which the separator is folded. A slot is cut in the fold line of one separator to allow the connector tab to protrude through for ease in connecting to an external terminal. After one long edge of the electrode is placed against the separator longitudinal center line, the separator is folded to cause the two opposite sides thereof to engage and cover the electrode main surfaces. The electrode is then rotated 180 degrees such that its longest unprotected edge is placed against the longest center line of the second separator. This second separator is also provided with strips of adhesive. By folding the second separator oppositely over the two main surfaces of the electrode, it overlaps the first separator. Prior to forming the jelly roll, the second electrode is placed bare on one side of the first electrode. The assembly is then wound into a jelly roll configuration and inserted into a can so that the bare electrode engages the can interior and the tab protrudes from the can end. The result is protection of the areas between the anode and cathode while also sealing the elongated edges of the electrode. Both of the electrode main surfaces are covered by two layers of separator while both of the electrode longest edges are covered by one layer of separator. Prior to insertion of the coiled jelly roll into the can, the jelly roll is held together because the outer separator is adhered to the inner separator and this is adhered to the electrode. After insertion of the jelly roll into the can, the pressure of the jelly roll against the closely fitting can retains the assembly. Adhesive is no longer necessary.

In another aspect, this invention is a process for encasing an electrode, comprising the following four steps. First, one edge of the electrode is placed against the first separator's longitudinal center line. Second, the separator is folded to cause the separator to engage and substantially cover the electrode's main surfaces. Third, an uncovered edge of the electrode is placed against the longitudinal center line of the second separator. Fourth, the second separator is folded oppositely over the main surfaces of the electrode already covered by the first separator such that the second separator overlaps and substantially covers the first separator.

In yet another aspect, this invention is a process for encasing an electrode with separator and then winding the encased electrode and a second electrode into a jelly roll assembly for placement in a container for a galvanic cell. This process is comprised of the following steps. First, one edge of the first electrode is placed against the longitudinal center line of a first separator. Second, the first separator is folded so as to engage and substantially cover the first electrode's main surfaces. Third, one of the first electrode's uncovered edges is placed against the longitudinal center line of a second separator. Fourth, the second separator is folded over the main surfaces of the first electrode so that the second separator overlaps and substantially covers the first separator thereby forming an encased electrode. Fifth, the encased electrode is wound with a second electrode to form a jelly roll assembly. Sixth, the wound electrode assembly is inserted into a can which serves as the container for the battery.

The new development has several advantages. First, the problem of leaving excess separator along at least one long edge of the electrode is completely eliminated. This improvement substantially reduces the amount of wasted separator. As the minimum quantity of separator per cell is reduced the amount of active material can be increased. Second, because there are no seamed edges along the longest sides or edges of the electrode, the encased separator can be controlled with mechanical guides on both edges as it is fed through the winding process. Third, the use of an adhesive to seal the separator to the ends of the electrode effectively prevents any loose electrode particles from floating freely in the electrolyte and causing an internal electrical short. Fourth, providing both sides of the electrode with a double layer of separator virtually eliminates internal shorting due to the existence of small holes in the separator. The growth of crystals through the separator is also greatly reduced when two thin layers of separator are used in place of one relatively thick layer of separator. Fifth, the separator/electrode construction allows the battery manufacturer to wrap and store the positive electrode for an indefinite period of time. This is a distinct advantage when compared to assignee's current production process which requires that the positive and negative electrodes be inserted into the separator at the same time and then assembled in a battery within five days. These time restrictions are needed to limit oxidation of the negative electrode. Sixth, the uniform thickness of the separator layers over the faces of the electrodes enables the jelly roll to be wound in a uniform manner. The elimination of relative "high spots" that are usually caused by overlapping separators is instrumental to obtaining even pressure across the face of the wound electrodes

BRIEF DESCRIPTION OF THE DRAWINGS

FIG. 1 is a plan view of one of the two like separator sheets;

FIG. 2 is a diagrammatic view showing one separator sheet being folded over an electrode;

FIG. 3 is a diagrammatic perspective view of the second separator sheet being folded over the first separator sheet and electrode; and FIG. 4 is an end elevational view of the electrode and separator assembly.

DESCRIPTION OF THE PREFERRED EMBODIMENT

Referring now specifically to the drawings, in FIG. 1 is depicted a first separator sheet formed of a typical electrically insulative material such as nonwoven polyamide (nylon) fibers, modacrylic fibers, polypropylene fibers, or fibrous reinforced regenerated cellulose or the like. This separator sheet 12 has a length dimension, a width dimension and a uniform thickness. The length dimension is the longer dimension depicted, being substantially the same as but slightly greater than the length of electrode 14 (FIG. 2) to overlap the end edges of the electrode slightly. The separator sheet therefore has a length which can be typified by L+e, "L" being the electrode length and "e" being a slight excess amount to be foldable or sealable over the short edges of the electrode. The separator sheet 12 also has a width which is twice the width of electrode 14, i.e. 2 W. Separator sheet 12 is to be folded along its longitudinal centerline 12' shown by the phantom line in FIG. 1. The thickness is about 0.0035 to 0.0100 inch, preferably about 0.0045 to 0.0050 inch. An adhesive is applied in a pattern to one face of the sheet. More specifically, extending across the double width of separator sheet 12, perpendicular to this center crease or fold line, are strips of adhesive. These basically are solid or broken linear strips, with one strip 16a adjacent one end but spaced slightly therefrom, a second strip 16b adjacent the opposite end but spaced slightly therefrom, and a third strip 16c in the center of the separator sheet, all parallel to each other and on the same face of the double width separator sheet. The preferred adhesive is a pressure sensitive adhesive such as an epoxy or urea formaldehyde adhesive, although other adhesives could be employed. The adhesive can be water soluble or water insoluble. Once the jelly roll is inserted into the can and electrolyte is added, the adhesive is no longer needed. Thus, if it is soluble in the electrolyte, or otherwise rendered inactive by the electrolyte, it does not matter. At one end of crease line 12' is a slit 12" extending a short distance from adhesive strip 16a toward the center, to allow an electrically conductive terminal tab 18 (FIG. 2) to extend therethrough. This tab is secured to electrode 14 in conventional fashion, e.g. by welding.

FIG. 2 depicts the step of assembly of this first foldable separator sheet to electrode 14. The electrode is initially of rectangular shape and of a material which can be rolled into a jelly roll configuration. Preferably, this is the positive electrode such as nickel/nickel hydroxide in a nickel cadmium cell because it is shorter than the negative cadmium electrode. The positive electrode has a typical thickness of about 0.025 to 0.036 inch. After conductive tab 18 is attached to electrode 14 adjacent one end thereof, extending beyond electrode 14 in the width dimension, this first separator sheet 12 is placed along one elongated edge of electrode 14 with tab 18 protruding through slot 12". Separator sheet 12 is folded toward its face containing the adhesive, over one elongated edge of the elongated, generally rectangular shaped electrode 14. This is done along center line 12' of the double width dimension of this first separator sheet, into a U-shaped configuration, to lie against the opposite side faces of the electrode. The leafs of the separator are pressed against the electrode to adhere them to it.

The adhesive strips 16a, b and c thus secure the two portions of separator 12 to the main opposite faces of electrode 14 to fully cover these opposite faces. At this point in the assembly operation, only one of the two elongated edges of electrode 14 is exposed.

A second foldable separator sheet 22 having length, width and thickness dimensions comparable to first sheet 12 is then placed with its center crease line along the still-exposed (second) elongated edge of electrode 14. FIG. 3 depicts this placement, the electrode and first separator sheet having been rotated through an angle of 180 degrees (such that tab 18 is shown to protrude in the opposite direction at the opposite end). This second sheet thus has a length "L+e" substantially the same as but slightly greater than the length of electrode 14 to overlap the short end edges slightly, and has a width twice that of the electrode width. Only one of the two substantially like separator sheets need have the slight excess length "e" to fold over or be sealed together along the short edges of the electrode. Comparable to the first separator, adhesive is in a pattern with strips of adhesive 26a and 26b extending across the double width dimension of sheet 22, perpendicular to the fold center line, near the ends of the sheet, while strip 26c is in the center of the second separator sheet. This second separator sheet is then folded into a U-shaped configuration toward the side having the adhesive, to cover the second uncovered elongated electrode edge and the first sheet at the main opposite side faces of the electrode. More specifically, the leafs of the second sheet are adhered to the outer faces of the first separator sheet. Adhesive strips 26a, b and c, preferably secured by pressure, attach the second separator sheet to the first separator sheet and the electrode. Both elongated edges of the electrode are then covered, each by a single layer of insulative separator sheet material, while both main side faces of the electrode are covered by two layers of insulative separator material in a uniform thickness across these side faces. This is shown more specifically in the fragmentary elevational view of FIG. 4.

Once the first and second separator sheets are thus securely attached to the electrode, with tab 18 protruding therefrom, a second bare electrode 30, such as a negative electrode as of nickel (see phantom lines in FIG. 4), is placed against the double separator sheets on one face of electrode 14. It typically has a thickness of 0.017–0.026 inch. This assembly is then rolled along the long dimension, i.e., with an axis perpendicular to the long dimension, to form a tight jelly roll arrangement, with the bare electrode on the outside. The assembly is then inserted into an electrically conductive container, e.g. a cylindrical metal can, in the manner described, for example, in U.S. Pat. No. 3,900,340. The outer electrode can make electrical contact with the container by having an exposed portion as in U.S. Pat. No. 3,900,340, incorporated by reference herein, by having a tab extending tangentially from the end of the rolled outer electrode o by otherwise having the bare electrode engage the inner container wall, such that the container serves as the second terminal. The container is filled with any conventional fluid electrolyte. Tab 18 can be welded to the container cover in conventional fashion to form the second terminal.

With this invention, the former practice of leaving significant excess separator material along the elongated edges of the electrode is eliminated, such that a substantially reduced amount of separator is placed in the container, leaving room for active electrode material.

When winding the separator sheets and electrodes into a jelly roll configuration, the absence of seamed edges along the long sides of the eleotrode enables mechanical guides to be used on these edges as it is fed through the winding process. The slight excess of separator material on the short edges, i.e. the ends of the electrode, allows these to be sealed effectively also, preventing loose electrode particles from floating freely in the electrolyte to cause internal electrical shorts. Internal shorting due to the existence of small holes in the separator is basically eliminated because both side faces of the electrode have double layers of separator material. This also inhibits the growth of crystals through the separator.

The battery manufacturer is provided an advantage with this structure because the separator/electrode unit can be made and stored for an indefinite period of time before final assembly, in contrast to present commercial processes which require positive and negative electrodes to be inserted into the separator at the same time and then assembled in a battery within five days or less.

Various additional advantages may appear to those in the art upon studying this disclosure. Also, it is conceivable that certain minor variations in the construction may be made without departing from the concept presented. Hence, the invention is intended to be limited not by the preferred embodiment depicted, but only by the scope of the appended claims and the reasonable equivalents to that defined therein.

The embodiments of the invention in which an exclusive property or privilege is claimed are defined as follows.

1. An electrode and separator assembly for winding into a jelly roll type configuration and placement in a container for a galvanic cell, comprising:
    a first electrode having a generally rectangular configuration with two opposite side faces, two opposite short edges and two opposite elongated edges;
    a first foldable separator sheet having a length dimension and a width dimension, said length dimension being substantially the same as that of one of said elongated edges, said width dimension being twice that of said first electrode, said first sheet being folded over said one elongated edge along the center line of said width dimension of said first separator sheet, in a U-shaped configuration, to lie against said electrode side faces and substantially fully cover said side faces;
    a second foldable separator sheet substantially like said first sheet, having a length dimension and a width dimension, said length dimension being substantially the same as that of the second of said elongated edges, said width dimension being twice that of said first electrode, said second sheet being folded over said second elongated edge along the centerline of said width dimension of said second sheet in a U-shaped configuration to overlap said first sheet over substantially all of said side faces, whereby both said elongated electrode edges are covered and said side faces are covered by two layers of separator in a uniform thickness across said faces;
    a conductive terminal tab protruding from said one electrode through one of said separator sheets at one of said electrode edges; and
    a second electrode adjacent said second sheet, separated from said first electrode by said second separator sheet and said first separator sheet, whereby said electrodes and sheets can be rolled into a jelly roll for insertion into a container to form a galvanic cell.

2. The electrode and separator assembly in claim 1 wherein said first sheet is adhered to said electrode, and said second sheet is adhered to said first sheet.

3. The electrode and separator assembly in claim 2 wherein said first sheet has strips of adhesive extending in said width dimension and said second sheet has strips of adhesive extending in said width dimension.

4. The electrode and separator assembly in claim 3 wherein said strips of adhesive are adjacent the edges of said sheets in said length dimension and in the center of said sheets.

5. The electrode and separator assembly in claim 1 wherein at least one of said separator sheets has a length slightly greater than the length of said first electrode and sealing off said short edges of said electrode.

6. An electrode and separator assembly for winding into a jelly roll type configuration and placement in a container for a galvanic cell, comprising:
    a first electrode having a generally rectangular configuration with two opposite side faces, two opposite short edges and two opposite elongated edges;
    a first foldable separator sheet having a length dimension and a width dimension, said width dimension being twice that of said first electrode, said length dimension being substantially the same as that of one of said elongated edges, said first sheet being folded over said one elongated edge along the center line of said width dimension of said first separator sheet, in a U-shaped configuration, to lie against said electrode side faces and substantially fully cover said side faces, said first sheet having adhesive in a pattern on one face thereof, adhering said sheet to said electrode side faces;
    a second foldable separator sheet substantially like said first sheet, having a length dimension and a width dimension, said length dimension being substantially the same as that of the second of said elongated edges, said width dimension being twice that of said first electrode, said second sheet being folded over said second elongated edge along the centerline of said width dimension of said second sheet in a U-shaped configuration to overlap said first sheet over substantially all of said side faces, whereby both said elongated electrode edges are covered and said side faces are covered by two layers of separator in a uniform thickness across said faces, said second sheet having adhesive in a pattern on one face thereof, adhering said second sheet to said first sheet at said electrode side faces;

a second electrode adjacent said second sheet, separated from said first electrode by said second separator sheet and said first separator sheet;

at least one of said separator sheets having a length slightly greater than the length of said first electrode and covering said short edges of said first electrode whereby said electrodes and sheets can be rolled into a jelly roll for insertion into a container to form a galvanic cell.

7. A galvanic cell of the jelly roll type comprising a container and cover, and an electrode and separator assembly in a jelly roll type configuration, said assembly comprising:

a first electrode having an initial generally rectangular configuration with two opposite side faces, two opposite short edges and two opposite elongated edges;

a first foldable separator sheet having a length dimension and a width dimension, said length dimension being substantially the same as that of one of said elongated edges said width dimension being twice that of said first electrode, said first sheet being folded over said one elongated edge along the center line of said width dimension of said first separator sheet, in a U-shaped configuration, to lie against said electrode side faces, and being adhered to said side faces and substantially fully cover said side faces;

a second foldable separator sheet substantially like said first sheet, having a length dimension and a width dimension, said length dimension being substantially the same as that of the second of said elongated edges, said width dimension being twice that of said first electrode, said second sheet being folded over said second elongated edge along the centerline of said width dimension of said second sheet in a U-shaped configuration to overlap said first sheet over substantially all of said side faces, and being adhered thereto, whereby both said elongated electrode edges are covered and said side faces are covered by two layers of separator in a uniform thickness across said a conductive terminal tab protruding from said one electrode through one of said separator sheets at one of said electrode edges; and a second electrode adjacent said second sheet, separated from said first electrode by said second separator sheet and said first separator sheet.

8. The cell in claim 7 wherein at least one of said separator sheets has a length slightly greater than the length of said first electrode and sealing off said short edges of said electrode.

* * * * *